Feb. 22, 1938.　　C. W. BENNETT ET AL　　2,109,042
GATE VALVE
Filed June 17, 1935　　2 Sheets-Sheet 1
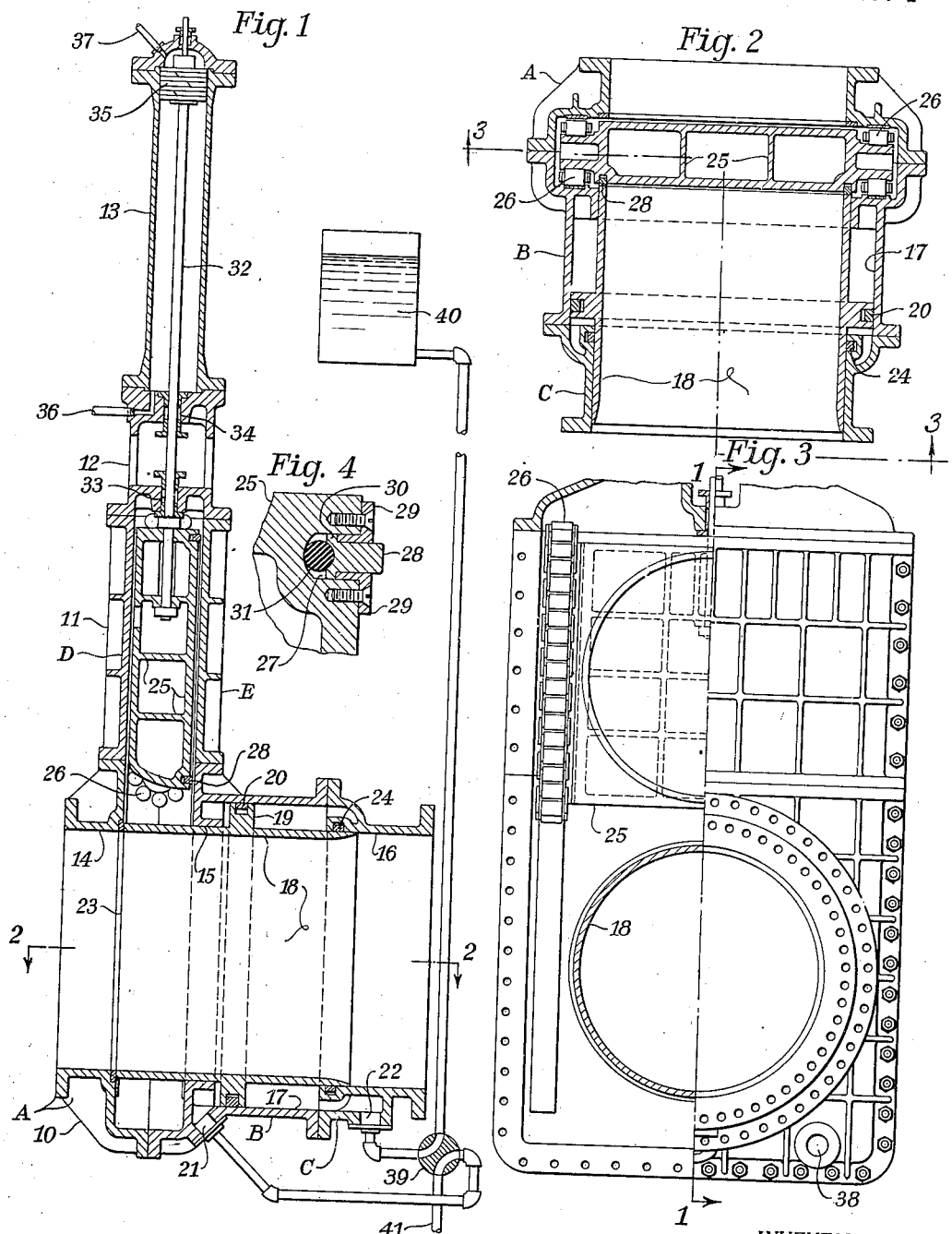
INVENTORS.
BYRON H. STAATS and
CLIFFORD W. BENNETT
ATTORNEY.

Feb. 22, 1938.   C. W. BENNETT ET AL   2,109,042
GATE VALVE
Filed June 17, 1935   2 Sheets-Sheet 2
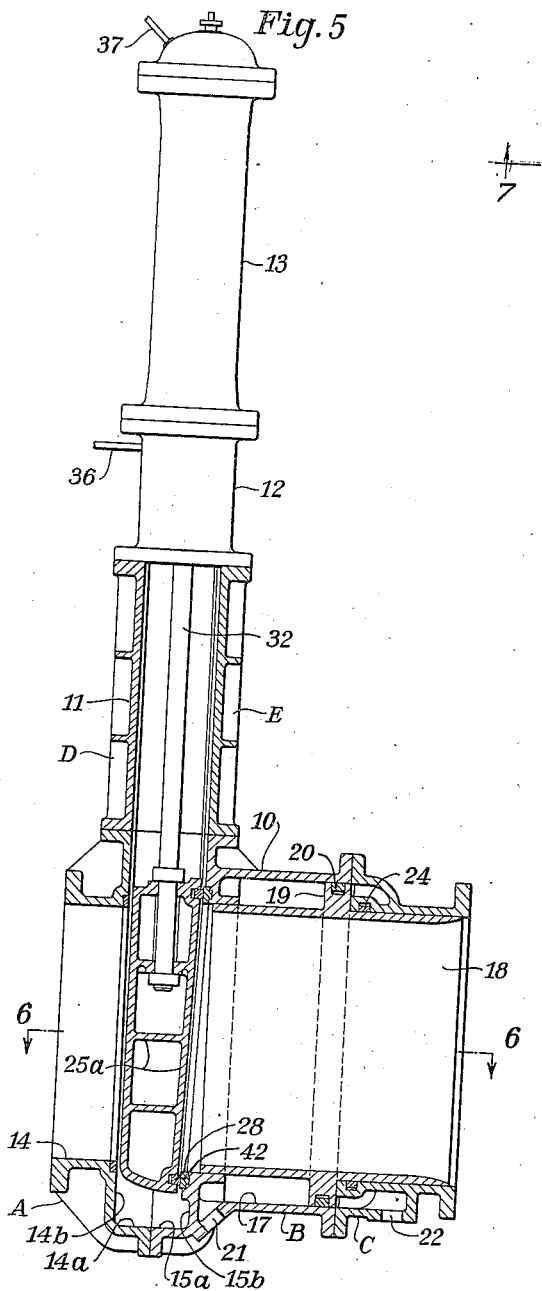
INVENTORS.
BYRON H. STAATS and
CLIFFORD W. BENNETT
ATTORNEY.

Patented Feb. 22, 1938

2,109,042

UNITED STATES PATENT OFFICE 2,109,042

GATE VALVE

Clifford W. Bennett and Byron H. Staats, Denver, Colo.

Application June 17, 1935, Serial No. 27,032

4 Claims. (Cl. 251—167)

This invention relates to improvements in gate valves and has reference more particularly to the larger types of gate valves such as are ordinarily employed in water conduits, but the invention is also applicable to the smaller types of gate valves.

Gate valves that are used in large water conduits, for shutting off the flow of water, are often of great size, and where they are employed to control water under a high pressure, they must be made massive and strong. Such valves are usually operated either in fully open or fully closed position, and since they are provided with a lateral gate leaf compartment and a recess extending beyond the wall of the passageway, eddies are produced when the water flows, which tend to reduce the hydraulic efficiency and to erode the valve seat. When the seals become defective, the gate leaf must be removed and this requires the water to be cut off while repairs are made.

It is an object of this invention to produce a gate valve of such construction that the passageway, at the place where the gate leaf is located, shall present a smooth surface to the flow of the water so as to prevent abrasion and erosion of the valve seat and to prevent loss of head at this point.

Another object of this invention is to produce a valve of such construction that the gate leaf can be removed for replacement or repair without taking the valve out of service and while water is flowing through the same.

Another object is to produce a gate valve in which the gate leaf can be moved with a comparatively small force and without subjecting the sealing surfaces to abrasion due to sliding under pressure.

A still further object is to produce a valve that does not require the conventional by pass when opening the gate.

Another object is to produce a gate valve that can be used for controlling the flow of water in either direction, and Another object is to produce a gate valve in which the sealing surfaces can be inspected and replaced while the valve is in open position.

The above and other objects that may become apparent as this description proceeds are attained by means of a construction and an arrangement of parts that will now be described in detail and for this purpose reference will be had to the accompanying drawings in which the improved valve has been illustrated, and in which Figure 1 is a longitudinal vertical section taken on line 1—1, Figure 3, and shows the parts in position to permit the flow of water;

Figure 2 is a longitudinal section taken on line 2—2, Figure 1, and shows the valve in closed position;

Figure 3 is a view, partly an end elevation and partly a section taken on line 3—3, Figure 2, but with the parts in the position shown in Figure 1.

Figure 4 is a section, to a somewhat enlarged scale, of the upper right hand corner of the gate leaf as shown in Figure 1;

Figure 5 is a longitudinal vertical section through the valve body and the bonnet of a slightly modified form of the invention;

Figure 6 is a section taken on line 6—6 of Figure 5, but in which the gate leaf is in open position and the auxiliary valve in closed position; and Figure 7 is a section taken on line 7—7, Figure 6, but with the parts in the position shown in Figure 5.

In the drawings, reference numeral 10 designates the valve body as a whole, numeral 11 designates the bonnet; 12 the bonnet cap, and 13 designates the valve gate control cylinder.

The valve body 10 comprises three separate parts which have been designated by letters A, B and C, and the bonnet is formed from two pieces D and E. The adjacent edges of the several parts are provided with cooperating flanges and are connected by bolts, all in the usual manner.

The body of the valve is provided with a cylindrical passageway composed of three separate and longitudinally spaced surfaces, 14, 15 and 16. Surfaces 14 and 15 are connected with the outer walls 14a and 15a by walls 14b and 15b, which are spaced apart to form a recess for the reception of the end and sides of the gate leaf.

Section B has a cylindrical inner surface 17 that is of considerably larger diameter than the surfaces 15 and 16. A tubular, cylindrical valve member 18 is slidably mounted on surfaces 15 and 16, and is provided with an outwardly extending flange or piston 19. The cylindrical surface of the piston is provided with a groove in which is located a piston ring 20. Openings 21 and 22 are provided in the walls of sections B and C for the purpose of admitting to and discharging water from the annular chambers on opposite sides of the piston for the purpose of moving the valve member 18.

The means for controlling the movement of the valve member will be described hereinafter. The diameter of the cylindrical surface 14 is the same as the inside diameter of the valve member 18, and the end of the latter engages the shoulder 23 which serves as an abutment and as a seal. The inside diameters of surfaces 15 and 16 are the same as the outside diameter of the tubular valve and the wall of surface 16 is provided with a sealing ring 24 to assure a leak proof joint at this place.

Positioned in the bonnet is a gate leaf 25, which is preferably hollow. The ends of the leaf are provided with endless roller train bearings 26 that cooperate with suitable surfaces on the gate and on the inside of the bonnet so as to reduce friction. In the embodiment illustrated in Figures 1, 2, 3 and 4, the opposite side surfaces of the gate leaf are parallel and the side nearest the tubular valve member is provided with a circular groove 27 in which is positioned a sealing ring 28 that is held in place by one or two rings 29 which engage the flanges 30. A rubber ring 31 is located in the groove between the bottom and the inner surface of the ring 28, and this is normally deformed and acts as a spring.

The rubber ring also acts as a seal and prevents fluid from passing from one side of the ring to the other.

The diameter of the ring 28 and its position on the gate leaf is such that when the gate leaf is lowered into passage closing position and the tubular valve member 18 is moved against the gate leaf, the end of the valve member will engage the ring and form a seal, in the manner shown in Figure 2.

A piston rod 32 is secured to the gate leaf in the manner shown in Figure 1 and this passes through a stuffing box 33 in the cap of the bonnet and through another stuffing box 34 into the cylinder 13 where it is attached to the piston 35. Openings 36 and 37 are provided respectively below and above the piston to admit fluid under pressure and to permit it to be discharged. The gate leaf is raised and lowered by the hydraulic means just described. It is apparent that some mechanical means, such as a screw and nut or a rack and pinion can be substituted for the cylinder and piston if desired.

The valve illustrated in Figures 1 to 4 is so constructed that water can flow through it in either direction but for the purpose of this explanation it will be assumed that the left side in Figure 1 is the higher pressure side.

When the valve is open and water flowing through it, the gate leaf is in raised position, and the tubular valve member 18 moved toward the left until its end engages the shoulder 23 and is held against this abutment or shoulder by pressure exerted hydraulically on the right hand side of piston 19.

It is evident that when the parts are in the position shown in Figure 1 the bonnet cap can be removed and the gate leaf removed from the bonnet without interrupting the flow of the water as the tubular valve member 18 will form a seal between the passageway and the lateral gate compartment.

In the larger valves of this type it is possible for a man to enter through the bonnet and crawl completely around the outside of the tubular valve member. When a man is to enter the valve it is first drained by opening the handhole 38.

When the valve is to be closed, the four-way valve 39 is operated to connect the piston chamber on the left side of piston 19 with the fluid pressure reservoir 40, and connect the other end of the piston chamber through pipe 41 with the atmosphere. Piston 19 and valve member 18 will now move toward the right until the piston engages the adjacent end of section C. Piston 35 is now moved downwardly and the gate leaf is thereby lowered until the ring 28 comes into alinement with the tubular valve member, which position is determined by suitable stops or indicators not shown. Turning valve 39 the water pressure is now directed against the right side of piston 19 and valve 18 is forced against the seal ring 28.

Attention is called to the fact that the gate leaf moves quite freely whether the pressure is fairly equalized on both sides or not since it does not make sealing contact with any stationary part while it is in motion, there is very little frictional resistance due to this and no danger is incurred of abrading the sealing surfaces.

When the valve is to be opened, the tubular valve member 18 is first moved away from the sealing ring 28 and this permits liquid to flow past the gate leaf, thereby equalizing the pressures on opposite sides and obviating the necessity of providing an independently controlled by-pass. After the seal has been broken, hydrostatic pressure is applied to the under surface of piston 35, and the gate leaf 25 raised to the position shown in Figure 1 after which the tubular valve member is moved into sealing position against the shoulder 23.

When the parts are in the position shown in Figure 1, the wall of the passageway presents a smooth surface to the flow through the valve, and there are therefore no eddies formed to reduce the hydraulic efficiency and at the same time, it is possible to remove the gate leaf for repairs, as already explained.

In Figures 5, 6 and 7, a slightly modified form of the invention has been shown, the principal difference being that the gate leaf 25a is downwardly tapered and the sealing ring 28, instead of being positioned so as to be engaged by the end of the tubular valve member 18 in the manner shown in Figure 2, engages a removable seal ring 42 located in a groove in the wall 15b. When the gate leaf is in passage closing position (Figure 5) and the pressure applied to the left hand side of the gate leaf, the seal ring 28 will be forced against the seal ring 42 by the pressure of the fluid; and when the parts are in this position, the tubular valve 18 can be removed by first removing the section C.

A valve constructed as shown in Figure 5 should be provided with the conventional by-pass if the pressure on both sides is to be equalized when opening the gate. When the gate leaf is in passage opening position the tubular valve can be moved longitudinally so as to close the lateral compartment and abut the shoulder 23 in the same manner as above explained. When the tubular valve member is in the position shown in Figure 6 the gate leaf can be removed and in large valves, a man can pass downwardly through the bonnet and into the recessed space surrounding the tubular valve member 18, and the seal ring 42 can thus be inspected and removed and replaced while water is still flowing through the valve.

The form of valve shown in Figures 5, 6 and 7 is not reversible, but can very easily be made so by inclining both sides of the gate leaf and providing sealing surfaces on both sides.

It is, of course, possible to move the tubular valve 18 by other means than that shown but hydraulic means is considered to be the most suitable. It is to be understood, however, that the means shown is illustrative only and that any other equivalent means can be substituted without departing from the invention.

Particular attention is directed to the fact that the gate leaf can be removed without putting the valve out of service, and when the modification illustrated in Figures 5, 6 and 7 is employed, the tubular valve member 18 can also be removed without turning off the water, as the flow will be arrested by the gate leaf.

It is always preferable in opening large valves to close the conduit to the flow of water on the delivery side, and to equalize the pressure on both sides before moving the gate leaf, but this is not always practicable. The gate valves shown in the drawings can be opened and closed under full pressure as the roller train bearings reduce the friction so that the gate leaf can be operated under very great pressures if necessary.

When the gate leaf is in closed position and subjected to unequal lateral pressure the gate leaf will bend to some extent and when this occurs, the flexible ring 28 will permit a uniform seal with the end of the valve member 18. The rubber ring 31 functions to force the sealing ring against the end of the tubular valve member when the gate bends under the unequal pressure.

The valve shown and described, can of course, be used to control the flow of a liquid or a gas.

It will be seen that the closure between the sealing surfaces of the valve is effected by a movement substantially normal to the seal surfaces.

Having described the invention, what is claimed as new is:

1. A gate valve comprising a housing formed of a plurality of hollow sections joined in end-to-end arrangement and providing a fluid passage, a control chamber transverse of the fluid passage and extending beyond the housing at a side thereof, a gate leaf in the chamber movable in and out of passage closing position, one section at a side of the chamber being of lesser internal diameter than the other sections, the intermediate section having an inner, annular flange of greater internal diameter than the first-mentioned section, and a third section being of substantially the same internal diameter as the flange, a tubular, externally-shouldered valve-element in the last-mentioned section and the intermediate section, having an internal diameter corresponding to the section of lesser diameter and movable lengthwise of the passage into abutting relation with said section when the gate leaf is outside the fluid passage, the outer wall of the intermediate section engaging the shoulder on the valve-element and acting as a cylinder therefor, and means to admit a pressure fluid into said cylinder for moving the valve-element along the passage.

2. A gate valve comprising a housing formed of a plurality of hollow sections joined in end-to-end arrangement and providing a fluid passage, a control chamber transverse of the fluid passage and extending beyond the housing at a side thereof, a gate leaf in the chamber movable in and out of passage closing position, one section at a side of the chamber being of lesser internal diameter than the other sections, the intermediate section having an inner, annular flange of greater internal diameter than the first-mentioned section, and a third section being of substantially the same internal diameter as the flange, a tubular, externally-shouldered valve-element in the last-mentioned section and the intermediate section, having an internal diameter corresponding to the section of lesser diameter and movable lengthwise of the passage into abutting relation with said section when the gate leaf is outside the fluid passage, the outer wall of the intermediate section engaging the shoulder on the valve-element and acting as a cylinder therefor, and means to admit a pressure fluid into said cylinder at opposite sides of the valve shoulder for moving the valve lengthwise of the passage.

3. A gate valve comprising a housing formed of a plurality of hollow sections joined in end-to-end arrangement and providing a fluid passage, a control chamber transverse of the fluid passage and extending beyond the housing at a side thereof, a gate leaf in the chamber movable in and out of passage closing position, one section at a side of the chamber being of lesser internal diameter than the other sections, the intermediate section having an inner, annular flange of greater internal diameter than the first-mentioned section, and a third section being of substantially the same internal diameter as the flange, a tubular, externally-shouldered valve-element in the last-mentioned section and the intermediate section, having an internal diameter corresponding to the section of lesser diameter and movable lengthwise of the passage into abutting relation with said section when the gate leaf is outside the fluid passage, the outer wall of the intermediate section engaging the shoulder on the valve-element and acting as a cylinder therefor, and valve-controlled means to admit a pressure fluid at opposite sides of the valve shoulder for moving the valve lengthwise of the passage.

4. A gate valve comprising a valve body providing a gate-leaf housing, a removable leaf bonnet on the housing, a gate-leaf adapted for movement in the housing and bonnet to close and open the valve, means for moving the leaf, a bonnet-sealing sleeve in the body movable through the leaf housing to a sealing position, providing a smooth surface or passage through the valve, an exterior flange on the sleeve intermediate the ends thereof forming an annular piston cooperative with the valve body, sealing means between the body and the sleeve at each side of the piston defining an annular cylinder, and means controlling the admission of fluid to said cylinder for moving the sleeve to and from its sealing position.

BYRON H. STAATS.
CLIFFORD W. BENNETT.